(12) United States Patent
Maeda

(10) Patent No.: US 6,714,495 B2
(45) Date of Patent: Mar. 30, 2004

(54) PICKUP DEVICE AND INFORMATION RECORDING/REPRODUCING APPARATUS USING THE SAME

(75) Inventor: Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 391 days.

(21) Appl. No.: 09/738,950

(22) Filed: Dec. 18, 2000

(65) Prior Publication Data
US 2001/0015942 A1 Aug. 23, 2001

(30) Foreign Application Priority Data
Dec. 20, 1999 (JP) .......................................... 11-361215

(51) Int. Cl.⁷ ................................................. G11B 7/00
(52) U.S. Cl. .............................. 369/47.51; 369/112.01; 369/112.16
(58) Field of Search ........................... 369/44.41, 47.17, 369/122, 47.51, 44.37, 112.01, 112.16

(56) References Cited
U.S. PATENT DOCUMENTS

| | | | | |
|---|---|---|---|---|
| 4,775,968 A | * | 10/1988 | Ohsato | 369/44.37 |
| 5,033,040 A | * | 7/1991 | Fujita | 369/44.37 |
| 5,886,964 A | * | 3/1999 | Fujita | 369/44.37 |
| 6,493,297 B1 | * | 12/2002 | Isono et al. | 369/44.37 |

* cited by examiner

Primary Examiner—Nabil Hindi

(74) Attorney, Agent, or Firm—Morgan, Lewis & Bockius LLP

(57) ABSTRACT

A pickup device and an information recording/reproducing apparatus for reproducing information in which crosstalks have been suppressed without causing an erasure or the like of the information which has already been recorded on an information recording medium. The apparatus has a light source 1 for emitting first and second lights whose polarizing directions cross perpendicularly. The first and second lights are transmitted through a grating for merely transmitting the first light and diffracting the second light at a predetermined diffraction efficiency and those lights are converged by an objective lens, thereby forming a laser beam and irradiating it onto an optical disc. At the time of the recording of information, the second light is set to a light-off mode or a low power state and the recording of information is performed by the laser beam caused by the first light. At the time of the reproduction of information, both of the first and second lights are emitted, the reproduction of information is performed by the laser beam caused by the first light, and the laser beam caused on the basis of the diffraction light caused due to the diffraction of the second light is irradiated to the adjacent tracks. Consequently, at the time of the reproduction of information the laser beam of the low power is irradiated onto the adjacent tracks and the information to remove crosstalk components can be obtained without causing erasure or the like of the information.

12 Claims, 9 Drawing Sheets

FIG.5A
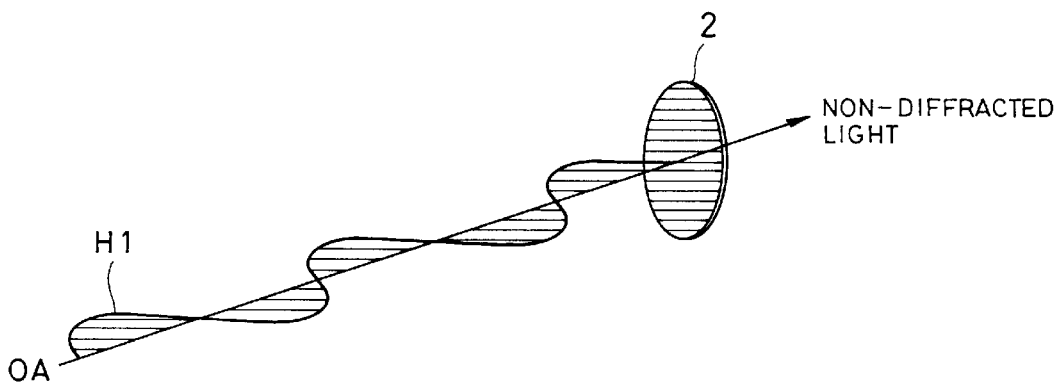
FIG.5B
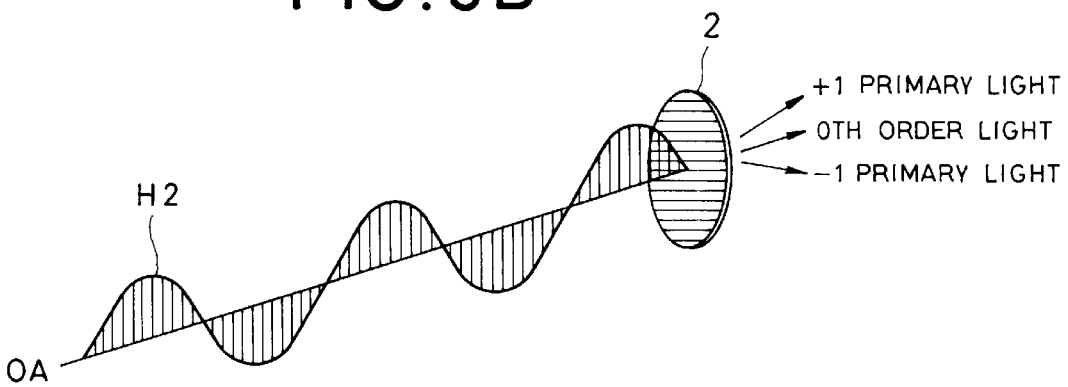
FIG.6
|  | AT THE TIME OF RECORDING OF INFORMATION | AT THE TIME OF REPRODUCTION OF INFORMATION |
|---|---|---|
| LASER BEAM H1 | ON (EMIT) | ON (EMIT) |
| LASER BEAM H2 | OFF OR LOW POWER | ON (EMIT) |

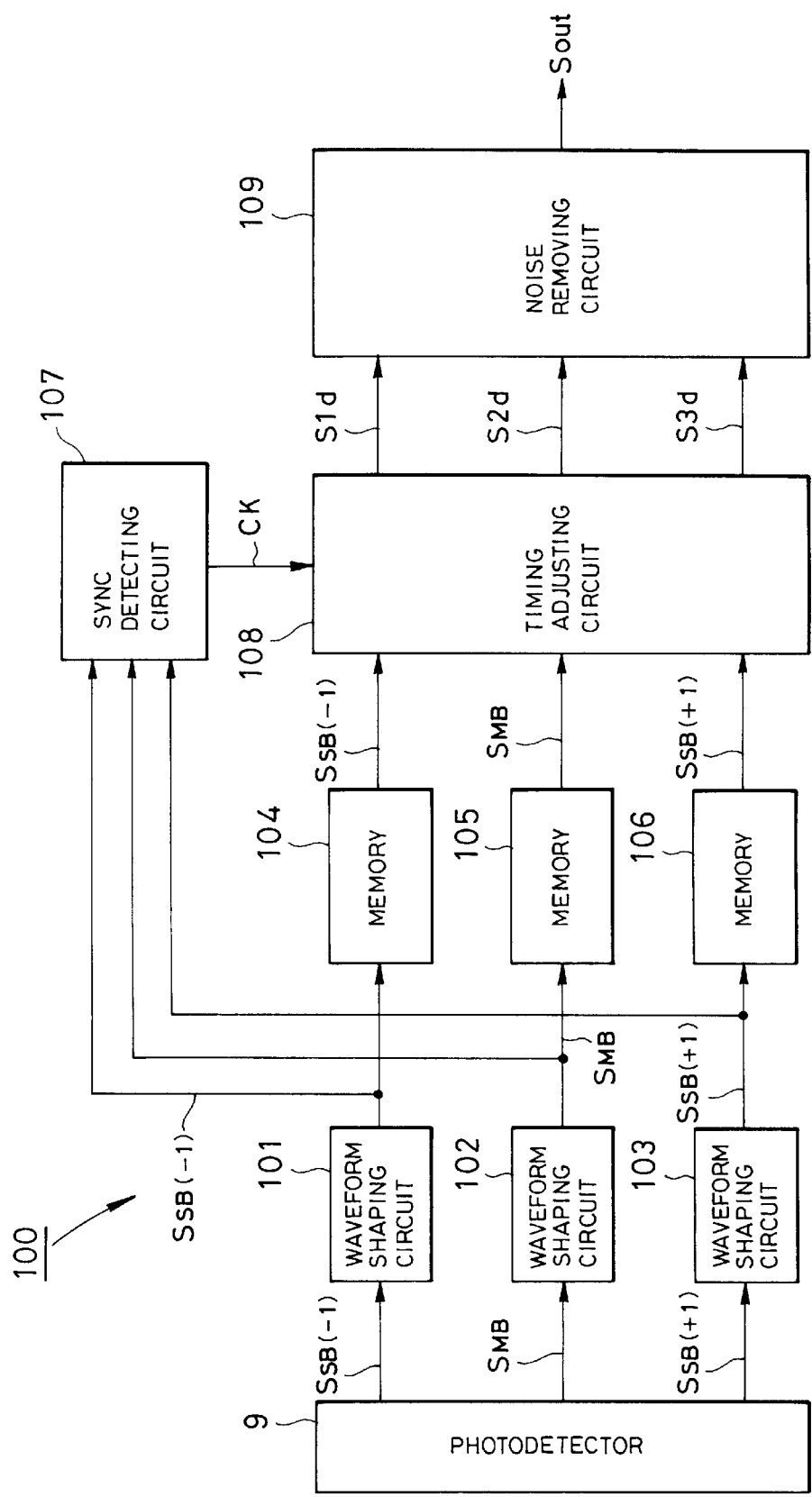

PICKUP DEVICE AND INFORMATION RECORDING/REPRODUCING APPARATUS USING THE SAME

BACKGROUND OF THE INVENTION

1. Field of the Invention

The invention relates to a pickup device for writing information to an information recording medium or reading information from the information recording medium and an information recording/reproducing apparatus having the pickup device.

2. Description of Related Art

In recent years, phase change type information recording media have been developed as information recording media of a large capacity which allows the recording of information at high density. The known kinds of the phase change type recording media are: a read only optical disc; a WORM-type optical disc in which information can be recorded once; and a rewritable type optical disc in which erasure and rerecording of information can be performed.

Those phase change type information recording media have a structure that information is recorded by causing a phase change of a crystal or amorphous recording layer or the like by means of light energy. The read only optical disc and WORM-type optical disc have such a characteristic that information is recorded only once by using its recording layer which is irreversibly changed by a light energy. The rewritable type optical disc has such a characteristic that information can be rewritten by using its recording layer which is reversibly changed by light energy. According to those phase change information recording media, the high density recording of information can be performed by narrowing the so called track pitch.

To realize an information recording/reproducing apparatus adapted to the information recording media that can perform the high density recording, there considered is a method for increasing a numerical aperture (NA) of an objective lens provided in the so-called pickup device, thereby a laser beam of a small irradiation diameter is irradiated to the recording layer. Thus, high density recording of information or reproduction of the information recorded at high density is performed.

It is also considered to apply a crosstalk cancelling technique in order to perform a precise reproduction of information in a limited range of the numerical aperture NA of the objective lens.

In the case of the reproduction of information from the phase change type information recording medium by using the conventional crosstalk cancelling technique, however, there are the following problems.

First, according to the conventional crosstalk cancelling technique, different laser beams are simultaneously irradiated to both of a track on which information to be reproduced has been recorded (hereinafter, referred to as a main track) and tracks adjacent to the main track (hereinafter, referred to as adjacent tracks), the reflection light by the laser beam irradiated to the main track (hereinafter, referred to as a main beam) and the reflection light by the laser beams irradiated to the adjacent tracks (hereinafter, referred to as sub beams) are optically detected, and a predetermined arithmetic operating process is performed based on each of detection signals detected, thereby removing a crosstalk component included in the detection signal reproduced from the main track.

In the conventional pickup device, an optical system having such a structure that an objective lens is used commonly for the recording of information and the reproduction of information in order to realize miniaturization, reduction of the weight, or the like. More specifically, there used is a construction such that a light emitted from a laser light source provided for the optical system is divided into a 0th order light beam and ±1 primary light beams by means of a grating (diffraction grating), the 0th order light beam is irradiated as a main beam to the main track through the objective lens, and the ±1 primary light beams are irradiated as sub beams to the adjacent tracks through the objective lens. That is, according to the conventional pickup device, the main beam and the sub beams are irradiated in each of the recording of information and the reproduction of information.

Therefore, if the power of a laser light source is raised in order to raise the power of the main beam (0th order light) to record information to the WORM-type optical disc or rewritable type optical disc, the powers of the sub beams (±1 primary light) are also raised accordingly. A problem is that, upon recording of information, the information already recorded on the adjacent tracks is erased or destroyed by the sub beams of the high powers, consequently.

To avoid the problem associated with the recording of information mentioned above, a method of reducing the powers of the sub beams (±1 primary light) by using a grating of a low diffraction efficiency has been considered. In this case, however, the power of the main beam (0th order light) rises by an amount corresponding to the reduced amount of the powers of the sub beams (±1 primary light) due to the use of the grating. Therefore, if the main beam and the sub beams are irradiated in order to effect the crosstalk cancellation when the information is reproduced from the read only optical disc, WORM-type optical disc, or rewritable type optical disc, a problem arises that the information on the main track is erased or destroyed by the high power main beam although the erasure or breakage of the information on the adjacent tracks by the sub beams is avoided.

OBJECTS AND SUMMARY OF THE INVENTION

The invention has been made to solve the problems of the conventional arrangement mentioned above, and it is an object of the invention to provide a pickup device and an information recording/reproducing apparatus, which allows execution of a precise recording of information to an information recording medium to which high density recording can be performed and a precise reproduction of information from the information recording medium to which the information has been recorded at high density.

Another object of the invention is to provide a pickup device which enables the recording of information and the reproduction of information to be performed by a same objective lens even when the crosstalk cancelling technique is applied.

According to a first aspect of the invention, there is provided a pickup device for recording information to an information recording medium and/or reproducing information from the information recording medium, comprising: a light source for emitting first light for irradiating a first laser beam for recording information or reproducing information onto the information recording medium at the time of the recording of information or the reproduction of information and second light for irradiating a second laser beam onto a track adjacent to a track on which the first laser beam is irradiated at least at the time of the reproduction of information; and control means for independently controlling powers of the first light and the second light.

According to the pickup device with this construction, by properly controlling the powers of the first light and the second light, the powers of the first light and the second light which are irradiated to the track of the information recording medium at the time of the recording of information or reproduction of information are adjusted, so that erasure or the like of the information which has already been recorded on the track can be prevented. At the time of the reproduction of information, each reflection light which is caused when the first and second laser beams are reflected by the track is detected and information in which crosstalk components have been suppressed can be reproduced on the basis of detection results.

According to the second aspect of the invention, the pickup device further has a grating arranged between the light source and the information recording medium, the light source has a structure such that the first and second lights whose polarizing directions cross perpendicularly are emitted, and the grating has a structure such that the first light is transmitted without being diffracted and the second light is diffracted and transmitted.

According to the pickup device with this construction, by adjusting a diffraction efficiency of the grating, the first and second laser beams with powers such that the information which has already been recorded on the track is not erased or the like at the time of the recording of information or reproduction of information can be formed.

According to the third aspect of the invention, in the pickup device according to the second aspect of the invention, the light source further has a single semiconductor laser or different semiconductor lasers for emitting the first and second lights whose polarizing directions cross almost perpendicularly.

According to this construction, the grating simply transmits the first light and diffracts the second light in the first and second lights whose polarizing directions cross perpendicularly. The second laser beam is formed by the diffracted light. At the time of the reproduction of information, consequently, the power of the second laser beam is reduced to a power at which the information which has already been recorded on the adjacent track is not erased, and the occurrence of the erasure or the like of the information can be prevented.

According to the fourth aspect of the invention, in the pickup device according to the first to third aspects of the invention, a first light emission end for emitting the first light of the light source and a second light emission end for emitting the second light are deviated with a predetermined distance.

According to this construction, since the first light and the second light are emitted from the deviated positions, the first laser beam and the second laser beam which are not overlapped are irradiated to each track. The increase in power to the track due to the overlap of the first and second laser beams is, thus, prevented and the erasure or the like of the information which has already been recorded on the track can be prevented at the time of the recording of information or reproduction of information.

According to the fifth aspect of the invention, in the pickup device according to the second to fourth aspects of the invention, a diffraction efficiency of the grating for the second light has been preset so that the second laser beam that is caused by the second light is set to a power at which the information on the track is not erased at the time of the reproduction of information.

According to this construction, the second laser beam which does not erase the information recorded on the track at the time of the reproduction of information is formed based on the power of the second light and the diffraction efficiency of the grating.

According to the sixth aspect of the invention, in the pickup device according to the first aspect of the invention, the light source is constructed by a separate structure comprising the first light source for emitting the first light and the second light source for emitting the second light, and the pickup device has: a grating for diffracting the second light; and wave synthesizing means for wave-synthesizing the diffraction light diffracted by the grating and the first light and irradiating the synthesized light to the information recording medium.

According to this construction, by adjusting the diffraction efficiency of the grating, it is possible to form the first and second laser beams of the powers such that the information which has already been recorded on the track is not erased [or the like] at the time of the recording of information or the reproduction of information. Each reflection light by the first and second laser beams is detected and the information whose crosstalk components have been suppressed can be reproduced on the basis of those detection results.

According to the seventh aspect of the invention, in the pickup device mentioned above, the first and second light sources further emit the first and second lights to the wave synthesizing means along the same optical axis.

According to this construction, the diffraction light in which the second light is diffracted by the grating, the 0th order light, and the first light are included in the wave synthesized light which is formed by the wave synthesizing means, the 0th order light and the first light are overlapped, and the first laser beam is caused. The diffraction light becomes the second laser beam. By controlling the powers of the first and second lights at the time of the recording of information or reproduction of information, therefore, the precise recording of information or reproduction of information can be performed. Since the power of the second laser beam is reduced in dependence on the diffraction efficiency of the grating, the erasure or the like of the information which has already been recorded is prevented and the reproduction of information can be performed. Each reflection light by the first and second laser beams is detected and the information whose crosstalk components have been suppressed can be reproduced based on those detection results.

According to the eighth aspect of the invention, in the pickup device according to the first to seventh aspects of the invention, the control means further controls so as to stop the emission of the second light or controls the second light so as to be set to a power at which the information recorded on the track is not erased at the time of the recording of information.

According to this construction, an erroneous erasure of the adjacent track due to the second light can be prevented at the time of the recording of information.

According to the ninth aspect of the invention, in the pickup device according to the first to eighth aspects of the invention, the control means further controls the second light so as to be set to a power at which the information recorded on the track is not erased at the time of the reproduction of information.

According to this construction, at the time of the reproduction of information, the tracking servo and focusing servo can be performed on the basis of the reflection light caused by the second light, and the information whose crosstalk components have been suppressed can be reproduced on the basis of each reflection light caused by the first and second lights.

According to the invention, there is provided an information recording/reproducing apparatus having the pickup device according to the first to ninth aspects of the invention, wherein the apparatus further comprises a crosstalk cancelling circuit for detecting each reflection light which is caused when the first and second laser beams are reflected by the track at the time of the reproduction of information and removing crosstalk components included in the reflection light caused by the first laser beam on the basis of each detection signal.

According to this construction, at the time of the recording of information or reproduction of information, the erasure or the like of the information which has already been recorded is prevented and, at the time of the reproduction of information, the crosstalk cancelling circuit reproduces the information whose crosstalk components have been suppressed on the basis of each reflection light caused by the first and second laser beams.

BRIEF DESCRIPTION OF THE DRAWINGS

FIGS. 5A and 5B are explanatory diagrams showing a positional relationship of the grating for laser beams H1 and H2;

FIG. 6 is an explanatory diagram showing the state of control of the laser beams H1 and H2;

FIG. 8 is a block diagram showing the construction of a crosstalk cancelling circuit;

DETAILED DESCRIPTION OF THE PREFERRED EMBODIMENTS

An embodiment of a pickup device and an information recording/reproducing apparatus of the invention will now be described below with reference to the drawings. A pickup device and an information recording/reproducing apparatus for performing an recording of information and reproduction of information by using a disk-shaped phase change information recording medium (hereinafter, referred to as an optical disc) will be described.

FIGS. 1 to 5 are diagrams showing a construction of the pickup device as a first embodiment. FIGS. 6 and 7 are diagrams for explaining the operation of the pickup device. FIG. 8 is a block diagram showing the construction of the information recording/reproducing apparatus of the embodiment having the pickup device and a crosstalk cancelling circuit.

Figure 1:
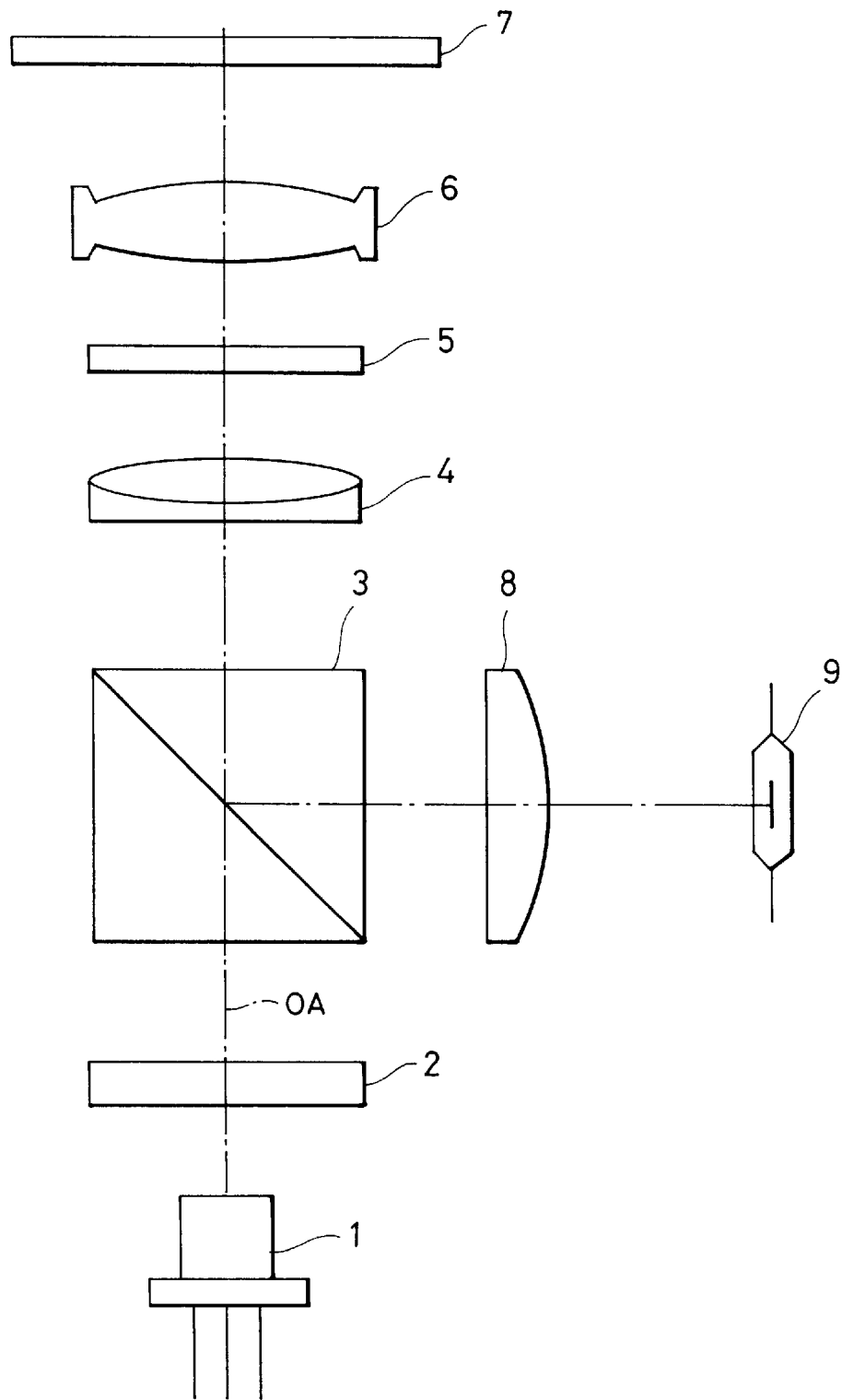
FIG. 1 is a diagram showing the construction of the first embodiment of a pickup device.

In FIG. 1, the pickup device comprises a light source 1 for emitting a laser beam; a grating 2; a beam splitter 3; a collimator lens 4; a ¼ wavelength plate 5; an objective lens 6; a condenser lens 8; and a photodetector 9. Those component elements are arranged along an optical axis OA.

The light source 1 is a laser light source for emitting two laser beams. For example, a light source with a structure shown in FIG. 3 or 4 is used.

Figure 3:
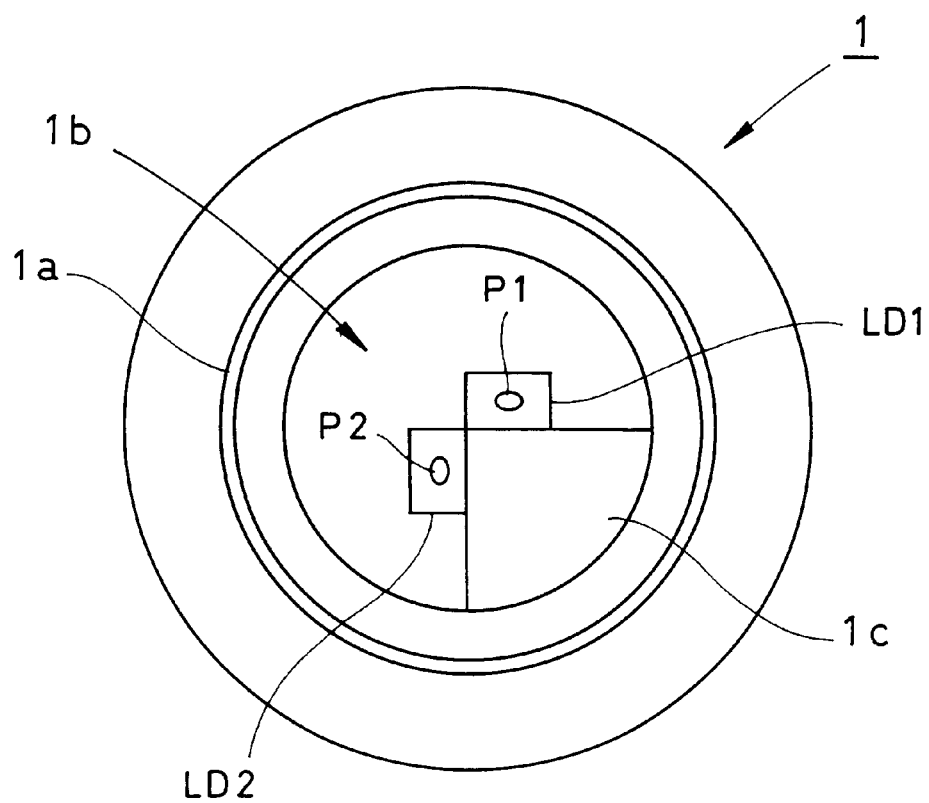
FIG. 3 is a plan view showing an example of the structure of a light source.
Figure 4:
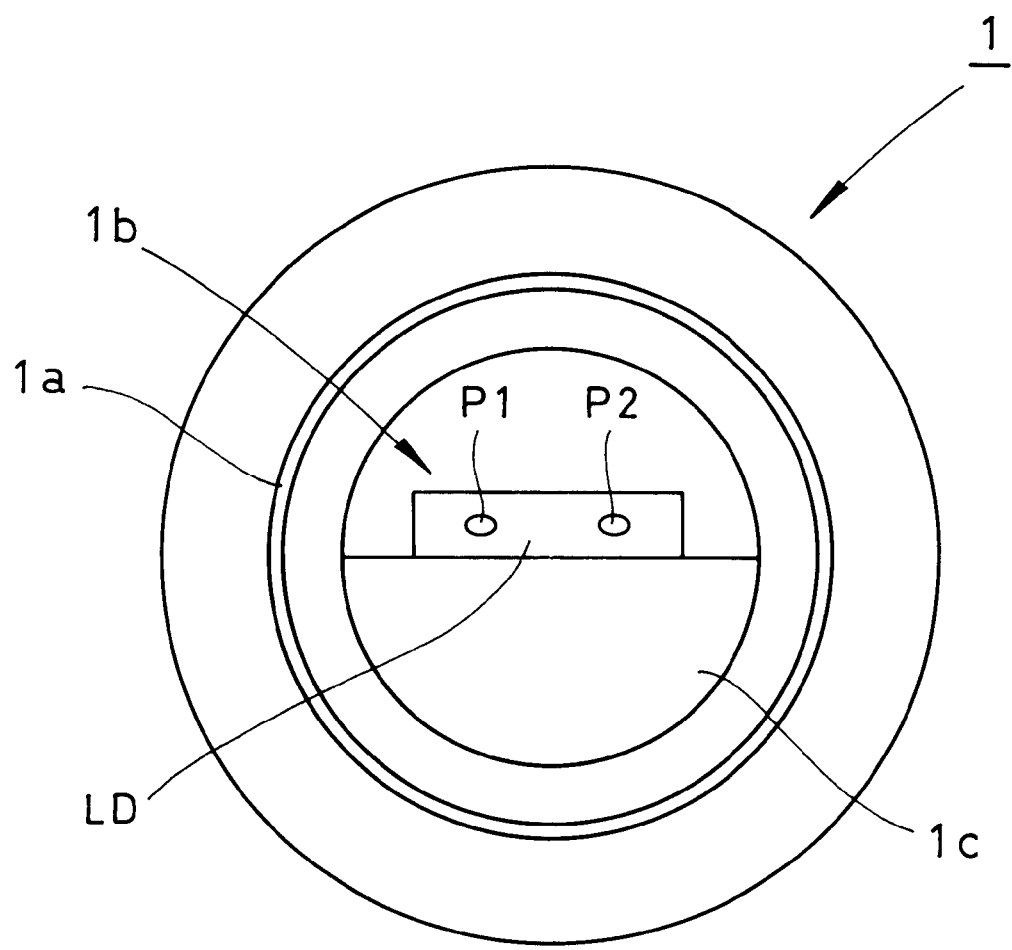
FIG. 4 is a plan view showing another example of the structure of a light source.

The light source 1 shown in a plan view of FIG. 3 has a structure such that different semiconductor lasers LD1 and LD2 for emitting laser beams H1 and H2 having the same wavelength and serving as linear polarization lights are enclosed in a cavity 1b of a package 1a.

Further, a heat radiating member 1c having a corner portion of almost a right angle is attached in the cavity 1b. The first semiconductor laser LD1 is fixed to a top end surface of the corner portion. The second semiconductor laser LD2 is fixed to a side end surface of the corner portion. Light emission ends P1 and P2 of the semiconductor lasers LD1 and LD2 are directed along the optical axis OA. The light emission end P1 is directed so as to be matched with the optical axis OA. The light emission end P2 is deviated from the light emission end P1 by a predetermined distance.

Since the different semiconductor lasers LD1 and LD2 having the same optical characteristics are attached to the heat radiating member 1c at almost the right angle, the polarizing direction of the laser beam H1 emitted from the light emission end P1 of the first semiconductor laser LD1 and that of the laser beam H2 emitted from the light emission end P2 of the second semiconductor laser LD2 cross almost perpendicularly.

Although the details will be mentioned in the operation description of the pickup device, the laser beam H1 is used for the recording of information and reproduction of information. At the time of the recording of information, the laser beam H1 is set to a power which can cause a phase change of a groove G of an optical disc 7, which will be explained later. At the time of the reproduction of information, the laser beam H1 is set to a power which can read the information without causing the phase change of the groove G of the optical disc 7, which will be explained later. The laser beam H2 is used for cancelling the crosstalks at the time of the reproduction of information and is not used for recording the information.

The light source 1 shown in a plan view of FIG. 4 has a structure such that a single semiconductor laser LD which has a pair of light emission ends P1 and P2 previously formed integratedly is enclosed in the cavity 1b of the package 1a.

Further, the semiconductor laser LD is fixed to a flat surface of the heat radiating member 1c fixed in the cavity 1b. The light emission ends P1 and P2 are directed along the optical axis OA. The light emission end P1 is directed so as to be matched with the optical axis OA. The light emission end P2 is deviated from the light emission end P1 by a predetermined distance.

Although the laser beams H1 and H2 having the same wavelength and serving as linear polarization lights are respectively emitted from the light emission ends P1 and P2, the polarizing direction of the laser beam H1 and that of the laser beam H2 cross perpendicularly. In the semiconductor laser LD, the emission control of the laser beams H1 and H2 from the light emission ends P1 and P2 can be independently performed.

Also in the light source 1 shown in FIG. 4, the laser beam H1 is used for the recording of information and reproduction of information. At the time of the recording of information, the laser beam H1 is set to a power which can phase change the groove G of the optical disc 7, which will be explained hereinlater. At the time of the reproduction of information, the laser beam H1 is set to a power which can read the information without causing the phase change of the groove G of the optical disc 7, which will be explained hereinlater. The laser beam H2 is used for cancelling the crosstalks at the time of the reproduction of information and is not used for recording the information.

The light source 1 shown in each of FIGS. 3 and 4 has a structure such that the two laser beams H1 and H2 whose polarizing directions cross almost perpendicularly are emitted and the laser beams H1 and H2 can be independently controlled. Since the light sources 1 shown in FIGS. 3 and 4 have the same optical characteristics, only the application of the light source 1 shown in FIG. 3 will be described.

Figure 2:
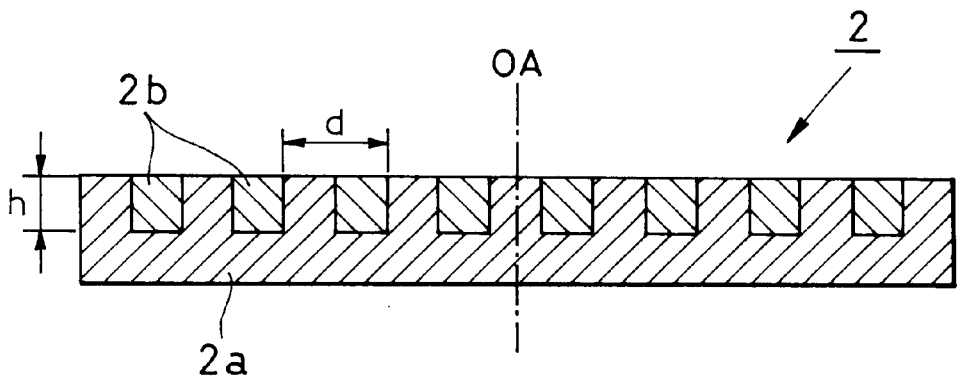
FIG. 2 is a vertical sectional view showing the structure of a grating.

The grating 2 is a transmitting type polarization grating having a structure as shown in a vertical sectional view of FIG. 2. The grating 2 is constructed by: a flat plate-shaped base portion 2a made of a uniform medium of a refractive index na; and a plurality of stripe-shaped grating portions 2b each of which is integratedly formed in the base portion 2a and made of a medium of a refractive index nb. Further, each grating portion 2b has a depth h and is formed at a predetermined period d.

As schematically shown in FIGS. 5A and 5B, the grating 2 is arranged in a manner such that the polarizing direction of the laser beam H1 from the light source 1 is parallel with the distributing direction of the grating portion 2b and the polarizing direction of the laser beam H2 crosses perpendicularly to the distributing direction of the grating portion 2b. The grating 2, consequently, transmits the laser beam H1 without diffracting it and diffracts the laser beam H2 in accordance with a primary diffraction efficiency η which is determined on the basis of the refractive index na of the base portion 2a and the refractive index nb, depth h, and pitch interval d of the grating portion 2b and emits the laser beam H2.

In the embodiment, by setting the primary diffraction efficiency η to about 40%, each power of a −1 primary diffracted light (−1 primary light) and a +1 primary diffracted light (+1 primary light) is set to about 40% of the power of the laser beam H2. The power of the 0th order light is set to about 20% of the power of the laser beam H2. Each power of the 0th order light, −1 primary light, and +1 primary light is set to the power at which the information can be read without causing the phase change of the groove G of the optical disc when the information is reproduced by laser beams SB(−1) and SB(+1), which will be explained later.

The beam splitter 3 transmits the light entering from the grating 2, emits it toward the collimator lens 4, reflects the light entering from the collimator lens 4, and emits it to toward the condenser lens 8.

The collimator lens 4 converts the light from the beam splitter 3 into the parallel light and emits it toward the ¼ wavelength plate 5. The ¼ wavelength plate 5 converts the light of the linear polarization from the collimator lens 4 into the light of the circular polarization and emits it toward the objective lens 6. The objective lens 6 converges the light from the ¼ wavelength plate 5, thereby converting it into the laser beam having a small irradiation diameter, and irradiates it onto the optical disc 7 in an in-focus state.

The reflection light caused in association with the irradiation of the laser beam to the optical disc 7 passes through the objective lens 6, ¼ wavelength plate 5, collimator lens 4, and beam splitter 3 and enters the condenser lens 8. The reflection light is converged by the condenser lens 8 and received by the photodetector 9.

Figure 7A:
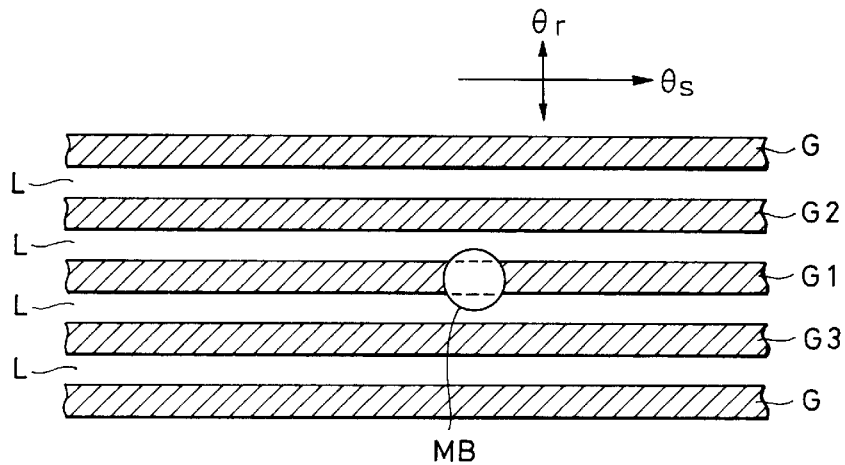
FIGS. 7A to 7C are plan views schematically showing the state of the laser beams which are irradiated to an optical disc.
Figure 7B:
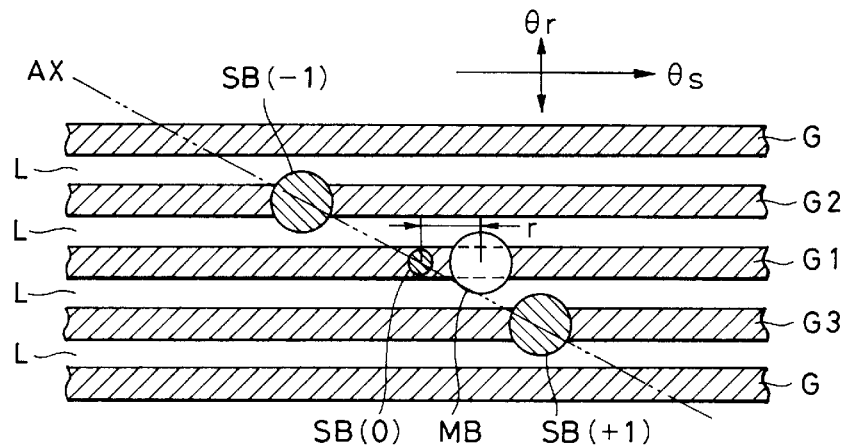
Figure 7C:
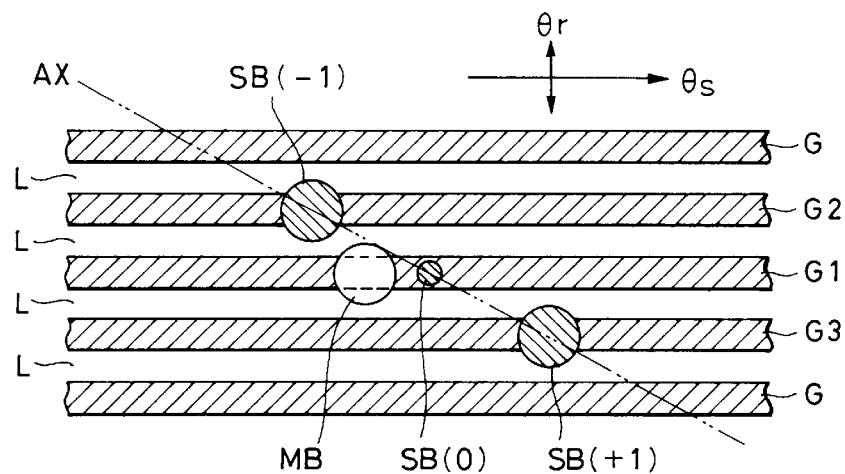

Subsequently, the operation of the pickup device having the construction will be described with reference to FIGS. 6 and 7A to 7C. FIG. 6 shows control states of the first and second semiconductor lasers LD1 and LD2 at the time of the recording of information and reproduction of information. FIGS. 7A to 7C show relations of the irradiating positions of the laser beams at the time of the recording of information and reproduction of information to the optical disc 7 having the grooves G on which information is recorded and lands L. For convenience of explanation, the diagrams are illustrated on the assumption that a groove G1 corresponds to a track to which the recording of information or reproduction of information is performed and grooves G2 and G3 correspond to adjacent tracks. A line scanning direction in which the pickup device moves relatively when the recording of information or reproduction of information is performed is shown by ⊖s and the direction (hereinafter, referred to as a radial direction) which crosses perpendicularly to the line scanning direction ⊖s is shown by ⊖r.

First, the operation at the time of the recording of information will be explained. When the recording of information is performed, as shown in FIG. 6, the first semiconductor laser LD1 is lit on and the second semiconductor laser LD2 is lit off, thereby emitting only the laser beam H1. Further, the laser beam H1 which is emitted from the first semiconductor laser LD1 is modulated by information to be recorded.

The laser beam H1 emitted from the light source 1, therefore, is not diffracted in the grating 2 but passes through the beam splitter 3, collimator lens 4, and ¼ wavelength plate 5 as mentioned above, is shaped into a laser beam MB of a small diameter by the objective lens 6, and is positioned and irradiated onto the groove G1 to record the information as shown in FIG. 7A, so that the information is recorded to the groove G1.

The laser beam H2 of a low power can be also emitted from the second semiconductor laser LD2 instead of perfectly lighting off the second semiconductor laser LD2 at the time of the recording of information. In this case, since the laser beam H2 of the low power is diffracted by the grating 2, the 0th order light SB(0) and ±1 primary lights SB(+1) and SB(−1) caused by the diffraction are irradiated to the grooves G1 to G3 as shown in FIG. 7B. If the laser beam H2 of such a low power that the recording of information is not performed to the grooves G1 to G3 by the 0th order light SB(0) and ±1 primary lights SB(+1) and SB(−1) is emitted, however, the recording of information can be performed by the laser beam MB which is formed by the laser beam H1. The influences by the 0th order light SB(0) and ±1 primary lights SB(+1) and SB(−1) can be ignored.

As a modification, it is also possible to construct the apparatus in a manner such that the laser beam H1 for recording of information is emitted from the first semiconductor laser LD1 and the laser beam H2 of a predetermined power is emitted from the second semiconductor laser LD2, thereby irradiating the laser beam MB for recording and the 0th order light SB(0) and ±1 primary lights SB(+1) and SB(−1) as shown in FIG. 7C, and the recording of information is performed by the light energy of the laser beam MB and the 0th order light SB(0).

In the case of the modification, however, the attaching positions of the first semiconductor laser LD1 and second semiconductor laser LD2 are previously adjusted and those laser beams are irradiated in a manner such that the 0th order light SB(0) is preceding in the line scanning direction ⊖s and the laser beam MB follows it as shown in FIG. 7C. With this method, the groove G1 is set into a critical state just before the phase change by the energy of the 0th order light SB(0) and the actual recording of information can be performed to the portion in the critical state by the subsequent laser beam MB.

The operation at the time of the reproduction of information will now be described with reference to FIG. 7B. When the reproduction of information is performed, as shown in FIG. 6, by lighting on both the first and second semiconductor lasers LD1 and LD2, both the laser beams H1 and H2 are emitted.

In a manner similar to the case of FIG. 7B, consequently, the laser beam H1 emitted from the light source 1 is not diffracted in the grating 2 as mentioned above but passes through the beam splitter 3, collimator lens 4, and ¼ wavelength plate 5, is shaped into the laser beam MB of a small diameter by the objective lens 6, and is positioned and irradiated onto the groove G1 on which the information has already been recorded.

Further, since the laser beam H2 emitted from the light source 1 is diffracted by the grating 2 as mentioned above, it is divided into the 0th order light and the ±1 primary lights. The divided lights pass through the beam splitter 3, collimator lens 4, and ¼ wavelength plate 5, are shaped into the laser beam MB of a small diameter by the objective lens 6, and are positioned and irradiated onto the groove G1 and adjacent grooves G2 and G3 on which the information has already been recorded.

That is, in a manner similar to the case of FIG. 7B, the 0th order light is irradiated as a laser beam SB(0) onto the groove G1, the −1 primary light is irradiated as a laser beam SB(−1) onto the groove G2, and the +1 primary light is irradiated as a laser beam SB(+1) onto the groove G3, respectively.

Since the primary diffraction efficiency η of the grating 2 is set to about 40% as mentioned above, a ratio of the powers of the laser beams SB(−1), SB(0), and SB(+1) is set to SB(−1): SB(0): SB(+1)≈0.4:0.2:0.4. Further, since the polarizing direction of the laser beam H2 and the grating 2 are previously inclined at a predetermined angle and set with respect to the line scanning direction ⊖s, the laser beams SB(−1), SB(0), and SB(+1) are positioned in a line along a virtual straight line AX in FIGS. 7A to 7C. The irradiating position of the laser beam MB is deviated from the irradiating position of the laser beam SB(0) by a distance r in accordance with relative deviation amounts of the light emission ends P1 and P2 of the first and second semiconductor lasers LD1 and LD2.

As mentioned above, since the laser beams MB and SB(0) are not irradiated to the same position on the groove G1 whose information should be reproduced and the power of the laser beam SB(0) is reduced to the power of about 20% by the grating 2, the light energy of the high power is not applied to the groove G1 and the erasure, breakage, or the like of the information which has already been recorded can be prevented.

Further, since each power of the laser beams SB(−1) and SB(+1) has been reduced to about 40% by the grating 2, the erasure, breakage, or the like of the information which has already been recorded on the adjacent grooves G2 and G3 can be prevented.

The photodetector 9 receives the reflection light caused by the laser beam MB and the reflection lights caused by the laser beams SB(−1) and SB(+1) and photoelectrically converts them. A photoelectric conversion signal $S_{MB}$ corresponding to the reflection light of the laser beam MB and photoelectric conversion signal $S_{SB(-1)}$ and $S_{SB(+1)}$ corresponding to the reflection lights of the laser beam SB(−1) and SB(+1) are supplied to a crosstalk cancelling circuit 100 shown in FIG. 8.

The crosstalk cancelling circuit 100 is constructed by: waveform shaping circuits 101, 102, and 103 for waveform shaping the photoelectric conversion signals $S_{MB}$, $S_{SB(-1)}$, $S_{SB(+1)}$ into binary logic signals $S_{MB}$, $S_{SB(-1)}$, $S_{SB(+1)}$; CCD memories 104, 105, and 106 serving as FIFO (first in first out) memories for temporarily storing the logic signals $S_{MB}$, $S_{SB(-1)}$, $S_{SB(+1)}$ respectively; a sync detecting circuit 107; a timing adjusting circuit 108; and a noise removing circuit 109.

The sync detecting circuit 107 detects physical address information of the grooves G1, G2, and G3 included in the logic signals $S_{MB}$, $S_{SB(-1)}$, $S_{SB(+1)}$ and discriminates a delay time τd of the laser beam SB(−1) for the laser beam MB in the line scanning direction ⊖s shown in FIG. 7B and a lead time τf of the laser beam SB(+1) for the laser beam MB on the basis of detection results. The sync detecting circuit 107 forms a sync signal CK indicative of the delay time τd and lead time τf in which the laser beam MB is set to a reference and supplies it to the timing adjusting circuit 108.

The timing adjusting circuit 108 reads out the logic signal $S_{MB}$ recorded in the CCD memory 105 on the basis of the timing of the sync signal CK and transfers the logic signal $S_{MB}$ as a logic signal S2d to the noise removing circuit 109. Further, the timing adjusting circuit 108 reads out the logic signal $S_{SB(-1)}$ at a timing which is earlier than the reading timing of the logic signal $S_{MB}$ by the delay time τd from the CCD memory 104 and transfers the logic signal $S_{SB(-1)}$ as a timing adjusted logic signal S1d to the noise removing circuit 109. Further, the timing adjusting circuit 108 reads out the logic signal $S_{SB(+1)}$ at a timing which is later than the reading timing of the logic signal $S_{MB}$ by the lead time τf from the CCD memory 106 and transfers the logic signal $S_{SB(+1)}$ as a timing adjusted logic signal S3d to the noise removing circuit 109.

As mentioned above, by adjusting the timings of the logic signals $S_{SB(-1)}$, $S_{MB}$, and $S_{SB(+1)}$ stored in the CCD memories 104, 105, and 106 on the basis of the delay time τd and lead time τf and transferring the resultant signals to the noise removing circuit 109, the logic signals $S_{SB(-1)}$, $S_{MB}$, and $S_{SB(+1)}$ including the information of the adjacent positions in the radial direction ⊖r of the grooves G1, G2, and G3 shown in FIGS. 7A to 7C are supplied to the noise removing circuit 109. That is, although the phases of the laser beams MB, SB(−1), and SB(+1) are actually deviated in the line scanning direction ⊖s, since the timing adjusting circuit 108 performs the timing adjustment on the basis of the sync signal CK, the logic signals $S_{SB(-1)}$, $S_{MB}$, and $S_{SB(+1)}$ which are obtained in the case where the laser beams MB, SB(−1), and SB(+1) were irradiated with the same phase (in other words, in a line in the radial direction ⊖r) in the line scanning direction ⊖s are apparently supplied to the noise removing circuit 109.

The noise removing circuit 109 sets off the crosstalk components included in the logic signal S2d by the logic signals S1d and S3d, thereby forming reproduction signal Sout in which the crosstalk components have been suppressed, supplying it to a reproducing circuit such as a decoding circuit or the like (not shown), and forming information to be inherently reproduced.

As mentioned above, the pickup device and information recording/reproducing apparatus of the embodiment have the light source 1 for emitting two laser beams H1 and H2 and the grating 2 not for diffracting the laser beam H1 but for diffracting the other laser beam H2 at the predetermined primary diffraction efficiency η, perform the recording of information by the laser beam H1 at the time of the recording of information, and read the information by the laser beams H1 and H2 and perform the crosstalk cancelling process, thereby properly reproducing the information at the time of the reproduction of information.

At the time of the recording of information, since the laser beam H1 is set to the power at which the groove G1 can be phase changed and the laser beam H2 is set to the light-off mode, the information is recorded only to the groove G1 on which the information should be recorded and the light of a high power is not irradiated to the grooves G2 and G3 or the like adjacent to the groove G1. Even if the information has already been recorded on the grooves G2 and G3 or the like, therefore, the information is not erased nor broken.

At the time of the reproduction of information, the power of the laser beam H1 is set to the power at which the groove G1 is not phase changed, the laser beam H2 is divided into the 0th order light and the ±1 primary lights of the powers at which the grooves G1, G2, and G3 are not phase changed on the basis of the predetermined primary diffraction efficiency η of the grating 2, and a situation such that the laser beams SB(0), SB(−1), and SB(+1) which are formed by the 0th order light and the ±1 primary lights are overlapped to the laser beam MB caused by the laser beam H1 is eliminated. The information which has already been recorded on the grooves G1, G2, and G3 can be properly reproduced without being erased or broken. Particularly, the crosstalk components can be removed on the basis of the photoelectric conversion signals $S_{MB}$, $S_{SB(−1)}$, $S_{SB(+1)}$ obtained by irradiating the laser beams SB(0), SB(−1), and SB(+1) without erasing or breaking the information which has already been recorded on the grooves G1, G2, and G3.

A pickup device with a simple structure in which the laser beams MB(0), SB(−1), and SB(+1) for performing the recording of information and the reproduction of information can be formed by one objective lens 6 can be provided.

Figure 9:
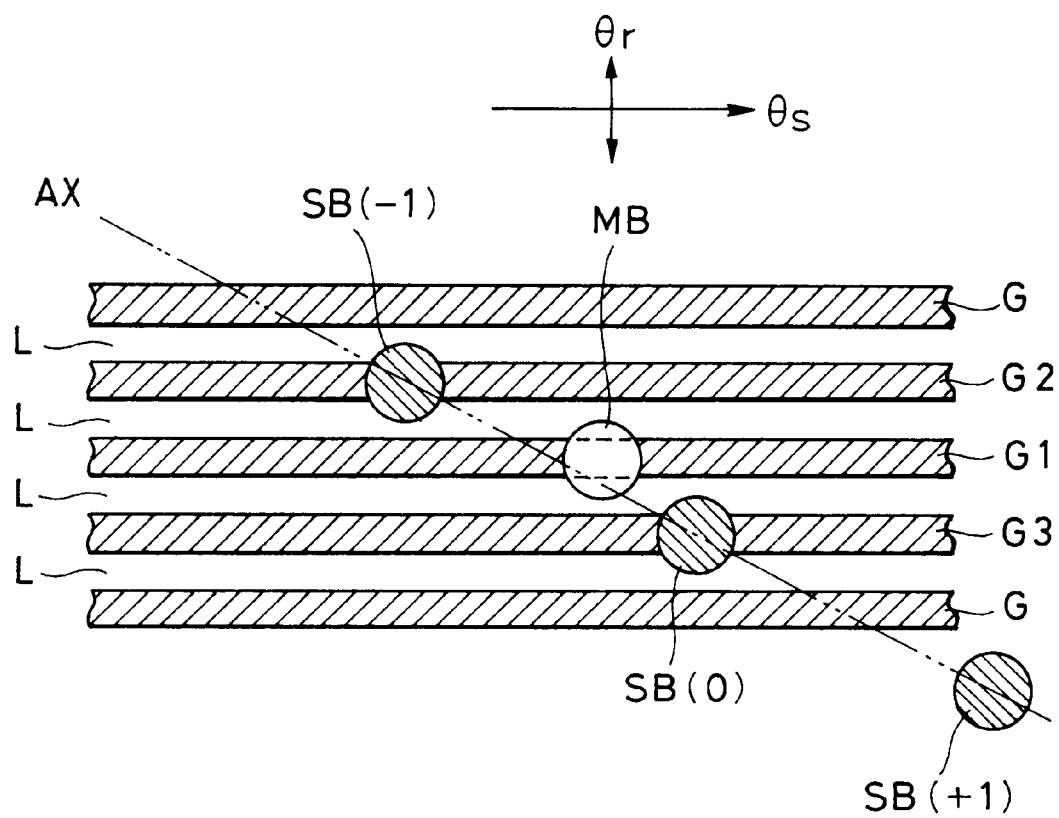
FIG. 9 is a plan view schematically showing another state of the laser beams which are irradiated to the optical disc.

In the embodiment, as shown in FIGS. 7A to 7C, although the laser beams SB(0), SB(−1), and SB(+1) based on the 0th order light and the ±1 primary lights which are obtained by diffracting the laser beam H2 are irradiated to the grooves G1, G2, and G3 at the time of the reproduction of information, the invention is not limited to this construction but another irradiating method can be also applied. For example, as shown in FIG. 9, at the time of the recording of information and reproduction of information, it is also possible to irradiate the laser beam MB caused by the laser beam H1 onto the groove G1 and irradiate the laser beams SB(0) and SB(−1) caused by the 0th order light and the −1 primary light which are obtained by diffracting the laser beam H2 onto the adjacent grooves G2 and G3. In this case, the construction can be realized by using a blazed grating as a grating 2.

According to the construction, at the time of the recording of information, both of the laser beams H1 and H2 are emitted, the power of the laser beam H1 is set to the power at which the groove G1 can be phase changed, and the power of the laser beam H2 is set to the power at which the grooves G2 and G3 are not phase changed. At the time of the reproduction of information, both of the laser beams H1 and H2 are emitted and the powers of the laser beams H1 and H2 are set to the powers at which the grooves G1, G2, and G3 are not phase changed.

That is, in any case of the recording of information and the reproduction of information, the laser beam H2 is set to the power at which the grooves G1, G2, and G3 are not phase changed and merely by adjusting the power of the laser beam Hi in accordance with the cases of the recording of information and the reproduction of information, the precise recording of information and reproduction of information can be performed. Not only in the case of the reproduction of information but also in the case of the recording of information, since the tracking servo, focusing servo, and the like can be performed on the basis of the reflection lights caused by the laser beams SB(0) and SB(−1), the recording of information and reproduction of information can be performed at a high precision.

Figure 10:
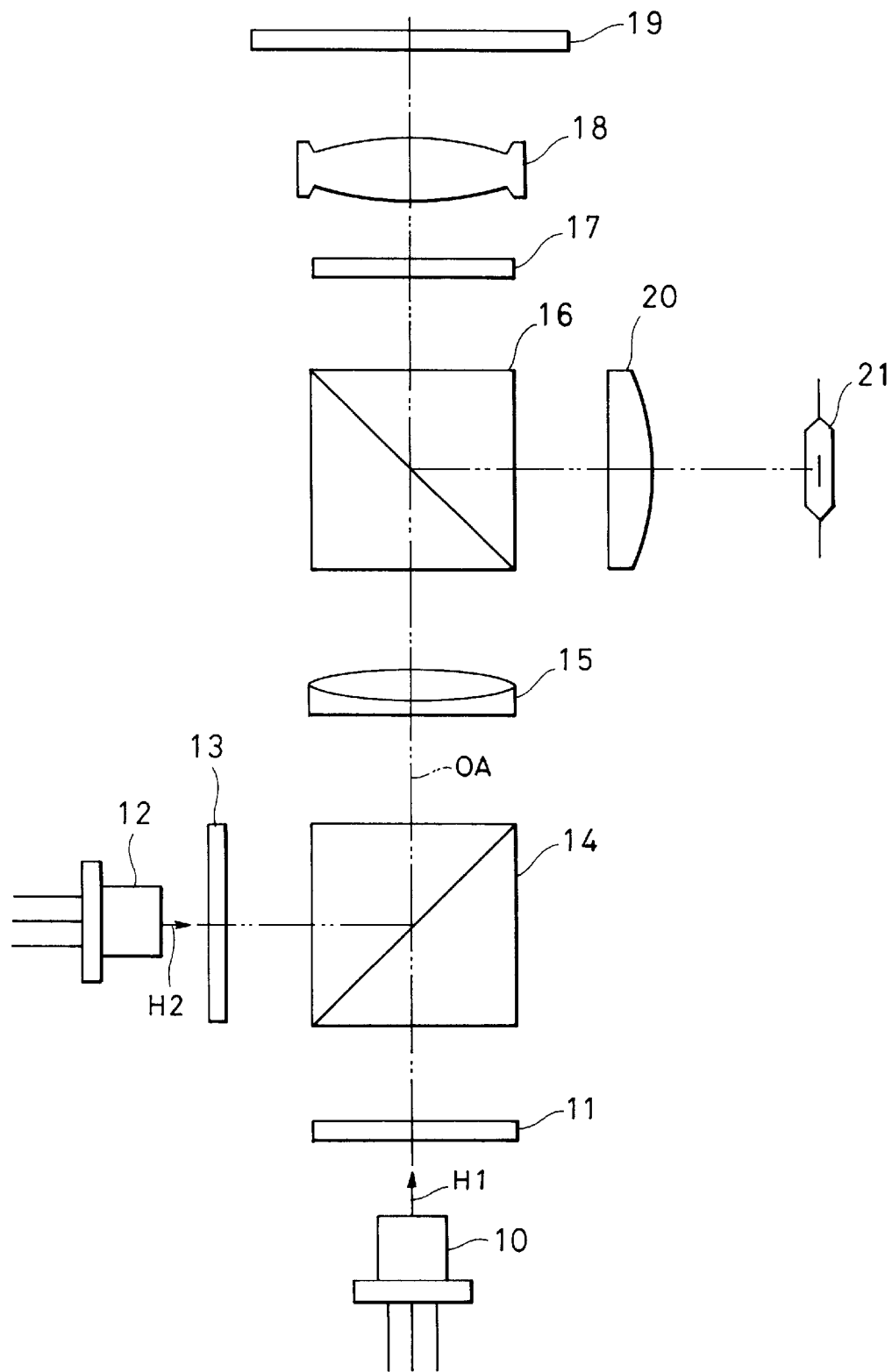
FIG. 10 is a diagram showing the construction of the second embodiment of a pickup device.

The second embodiment of the invention will now be described with reference to FIGS. 10, 11, and 12A to 12C. FIG. 10 is a block diagram showing a construction of a pickup device according to the embodiment. FIGS. 11 and 12A to 12C are diagrams for explaining the operation of the pickup device.

In FIG. 10, the pickup device is constructed by: first and second light sources 10 and 12 for emitting the laser beams H1 and H2, respectively; a cover glass 11; a grating 13; a wave synthesizer 14; a collimator lens 15; a beam splitter 16; a ¼ wavelength plate 17; an objective lens 18; a condenser lens 20; and a photodetector 21. Those component elements are arranged along the optical axis OA.

The first and second light sources 10 and 12 are semiconductor lasers for emitting the laser beams H1 and H2 having the same wavelength and serving as linear polarization lights. Both a light emission end (not shown) which is formed in the first light source 10 and emits the laser beam H1 and a light emission end (not shown) which is formed in the second light source 12 and emits the laser beam H2 are directed so as to be matched with the optical axis OA.

The grating 13 is a transmitting type polarization grating having the same structure and function as those of the grating 2 (refer to FIG. 2) described in the first embodiment, and is arranged in a manner such that the distributing direction of the grating portion 2b crosses almost perpendicularly to the polarizing direction of the laser beam H2 emitted from the light source 12. The grating 13, thus, diffracts the laser beam H2 in accordance with the predetermined primary diffraction efficiency η and emits the 0th order light and ±1 primary lights which are caused by the diffraction to the wave synthesizer 14 side.

The cover glass 11 is provided for suppressing a spherical aberration.

The wave synthesizer 14 synthesizes the waves of the 0th order light and ±1 primary lights from the grating 13 and the wave of the laser beam H1 entering through the cover glass 11 and emits the resultant light to the collimator lens 15 side.

The collimator lens 15 converts the wave synthesized light from the wave synthesizer 14 into the parallel light and emits it to the objective lens 18 side through the beam splitter 16 and ¼ wavelength plate 17.

Figure 11:
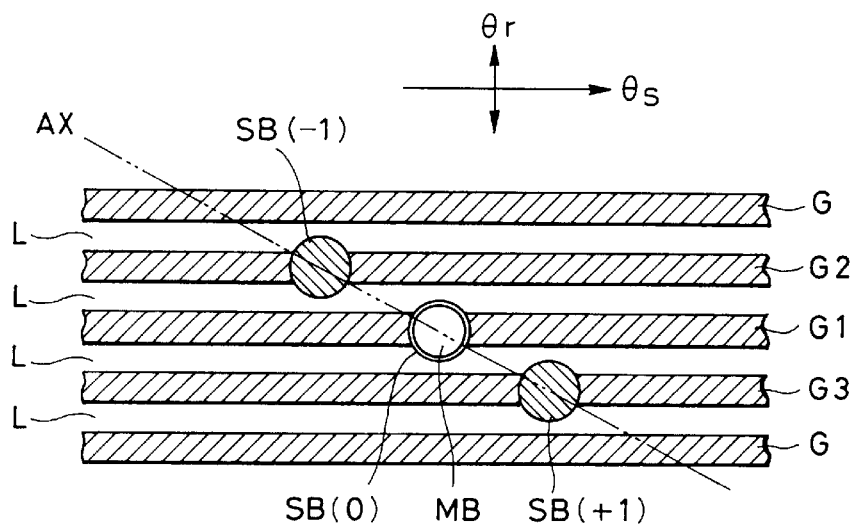
FIG. 11 is a plan view schematically showing the state of the laser beams which are irradiated to the optical disc.

The objective lens 18 converges the wave synthesized light which was circular polarized by the ¼ wavelength plate 17 and irradiates it as a laser beam of a small diameter in an in-focus state onto the optical disc 19. That is, as shown in FIG. 11, the objective lens 18 converges the 0th order light, ±1 primary lights, and laser beam H1 included in the wave synthesized light, respectively, thereby forming the laser beam SB(0) corresponding to the 0th order light, the laser beam SB(−1) corresponding to the −1 primary light, the laser beam SB(+1) corresponding to the +1 primary light, and the laser beam MB corresponding to the laser beam H1 and irradiates them onto the optical disc 19.

Each of the reflection lights caused when the laser beams SB(0), SB(−1), SB(+1), and MB are reflected by the optical disc 19 passes through the objective lens 18, ¼ wavelength plate 17, and beam splitter 16, enters the condenser lens 20, the condenser lens 20 converges the incident reflection lights, and the converged light is received by the photodetector 21.

The operation of the pickup device with the construction will be described with reference to FIGS. 11 and 12A to 12C. FIG. 11 shows a relation of the irradiating positions of the laser beams at the time of the recording of information and the reproduction of information to the optical disc 19 having the grooves G on which the information is recorded and the lands L. For convenience of explanation, the diagrams are illustrated on the assumption that the groove G1 corresponds to the track to which the recording of information or reproduction of information is performed and the grooves G2 and G3 correspond to adjacent tracks. When the recording of information or reproduction of information is performed, the line scanning direction in which the pickup device moves relatively is shown by ⊖s and the direction (hereinafter, referred to as a radial direction) which crosses perpendicularly to the line scanning direction ⊖s is shown by ⊖r.

First, the operation at the time of the recording of information will be explained. When the recording of information is performed, both the first and second light sources 10 and 12 are lit on to thereby emit the laser beams H1 and H2. The laser beam H1, however, is modulated by information to be recorded and emitted and the laser beam H2 is emitted as it is without being modulated.

The laser beam H1 is, consequently, irradiated as a laser beam MB onto the groove G1 shown in FIG. 11. The laser beam H2 is diffracted by the grating 13. The 0th order light caused by the diffraction becomes the laser beam SB(0), is multiplexed to the laser beam MB, and is irradiated. The −1 primary light becomes the laser beam SB(−1) and is irradiated onto the adjacent groove G2. The +1 primary light becomes the laser beam SB(+1) and is irradiated onto the adjacent groove G3. The laser beams SB(−1), SB(+1), MB, and SB(0) are irradiated along the virtual straight line AX in FIG. 11.

Figure 12A:
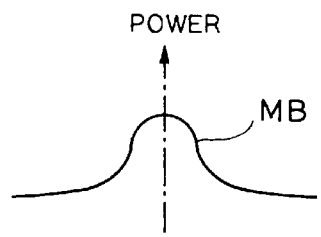
FIGS. 12A to 12C are explanatory diagrams for explaining powers of the laser beams which are irradiated to the optical disc.
Figure 12B:
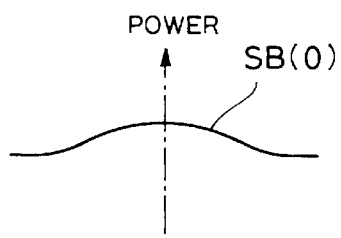
Figure 12C:
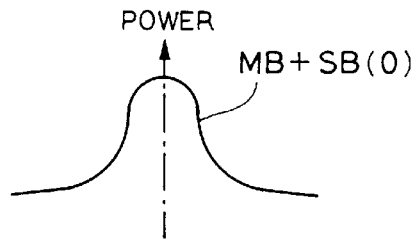

Since the powers of the laser beams MB and SB(0) shown in FIGS. 12A and 12B are added, a total power as shown in FIG. 12C is generated and the recording of information is performed by the total power. That is, the groove G1 is raised by the power of the laser beam SB(0) to a level near a critical level at which the phase change can be caused. By adding the power of the laser beam MB in this state, the groove G1 is phase changed.

Each reflection light caused when the laser beams SB(−1) and SB(+1) are reflected by the adjacent grooves G2 and G3 is photoelectrically converted by the photodetector 9. The photoelectric conversion signals are supplied to a servo circuit (not shown), so that they are used for what are called tracking servo, focusing servo, and the like.

Since each power of the laser beams SB(−1) and SB(+1) has been reduced by the primary diffraction efficiency η set in the grating 13, even if the information has already been recorded on the adjacent grooves G2 and G3, the phase change is not caused and the information is not erased nor broken.

The operation at the time of the reproduction of information will now be described. At the time of the reproduction of information, both of the first and second light sources 10 and 12 are lit on to thereby emit the laser beams H1 and H2. In this case, the laser beams H1 and H2 are emitted as they are without being modulated. The power of the laser beam H1, however, is set to the power at which the groove G1 is not phase changed.

The laser beam H1 is, consequently, irradiated as a laser beam MB onto the groove G1 shown in FIG. 11. The laser beam H2 is diffracted by the grating 13, the 0th order light caused by the diffraction becomes the laser beam SB(0), is multiplexed to the laser beam MB, and is irradiated. The −1 primary light becomes the laser beam SB(−1) and is irradiated onto the adjacent groove G2. The +1 primary light becomes the laser beam SB(+1) and is irradiated onto the adjacent groove G3. The laser beams SB(−1), SB(+1), MB, and SB(0) are irradiated along the virtual straight line AX in FIG. 11.

By adding the powers of the laser beams MB and SB(0) shown in FIGS. 12A and 12B, a total power as shown in FIG. 12C is generated. This total power is applied to the groove G1. As mentioned above, however, since the power of the laser beam H1 has been set to the power at which the groove G1 is not phase changed, the power of the laser beam MB is weak and the power of the laser beam SB(0) has also been reduced by the grating 13, so that the total power of the laser beams MB and SB(0) is lower than the critical level at which the groove G1 can be phase changed. The information which has already been recorded on the groove G1 is, consequently, read out without being erased or broken and detected by the photodetector 21.

Since the powers of the laser beams SB(−1) and SB(+1) have inherently been reduced by the grating 13, the adjacent grooves G2 and G3 are not phase changed and their reflection lights are detected by the photodetector 21.

The reflection lights caused by the laser beams MB and SB(0) and the reflection lights caused by the laser beams SB(−1) and SB(+1) are photoelectrically converted by the photodetector 21. The photoelectric conversion signals are supplied to the crosstalk cancelling circuit 100 shown in FIG. 8, so that the signal Sout in which the crosstalk components have been suppressed is generated. Each of the photoelectric conversion signals which are caused when the reflection lights caused by the laser beams SB(−1) and SB(+1) are photoelectrically converted by the photodetector 21 are supplied to the servo circuit and used for the tracking servo, focusing servo, and the like even at the time of the reproduction of information.

According to the embodiment, since the reproduction of information and recording of information can be performed while performing the tracking servo, focusing servo, and the like, the recording of information and reproduction of information can be performed at a high precision. Further, since the powers of the laser beams SB(−1) and SB(+1) which are irradiated to perform the tracking servo, focusing servo, and the like, and to cancel the crosstalks are set to the powers at which the grooves G1 and G2 are not phase changed, the information which has already been recorded is not erased nor broken.

According to the embodiment, although the power of the 0th order light for the laser beam H2 is set to about 20% by setting the primary diffraction efficiency of the grating 13 to about 40%, the power of the 0th order light for the laser beam H2 can be also set to about 0% by setting the primary diffraction efficiency of the grating 13 to about 50%. In this case, however, the power of the laser beam H2 is adjusted so that the powers of the laser beams SB(−1) and SB(+1) do not phase change the grooves G2 and G3.

At the time of the reproduction of information, it is also possible to light off the light source 10 and irradiate the laser beams SB(0), SB(−1), and SB(+1) by the laser beam H2 emitted from the light source 12. In this case, however, the power of the laser beam H2 and the primary diffraction efficiency η of the grating 13 are properly adjusted, thereby enabling the information to be reproduced without causing the phase change of the grooves G1, G2, and G3.

Although the first and second embodiments have been described with respect to the case of using the laser beams H1 and H2 having the same wavelength, the invention is not limited to it. A light source for emitting the laser beams H1 and H2 with different wavelengths can be also used.

As described above, according to the invention, there is provided the light source for separately emitting the first light to generate the first laser beam for performing the recording of information or reproduction of information and the second light to generate the second laser beam for reproducing the information on the adjacent tracks at least at the time of the reproduction of information, the second laser beam of the power at which the erasure or the like of the information is not caused is generated by diffracting the second light in accordance with the predetermined diffraction efficiency, and the powers of the first and second lights are independently controlled. At the time of the recording of information, therefore, the information can be properly recorded while preventing the erasure or the like of the information which has already been recorded. At the time of the reproduction of information, the information in which the crosstalk components have been suppressed can be reproduced while preventing the erasure or the like of the information which has already been recorded.

Since the tracking servo and focusing servo can be performed on the basis of the reflection light caused by the second laser beam, the high density recording of information can be performed or the information recorded at a high density can be reproduced.

What is claimed is:

1. A pickup device for recording information on an information recording medium and/or reproducing information from the information recording medium, comprising:

a light source for emitting a first laser beam and a second laser beam which irradiate an information recording medium during recording of information and/or during reproduction of information, the first laser beam irradiating a track of the information recording medium, and the second laser beam irradiating tracks adjacent to the track;

a controller for independently controlling powers of the first and second laser beams; and a grating positioned between said light source and said information recording medium, wherein said light source has a structure so as to emit the first and second laser beams whose polarized states are different from each other, and said grating has a structure so as to allow a predetermined linearly polarized component of an incoming beam to be transmitted therethrough without being diffracted.

2. A device according to claim 1, wherein said light source has a structure that said first and second laser beams whose polarized directions cross perpendicularly are emitted, and said grating has a structure such that said first laser beam is transmitted therethrough without being diffracted and said second laser beam is diffracted and transmitted therethrough.

3. A device according to claim 2, wherein said light source further has a single semiconductor laser or different semiconductor lasers for emitting said first and second laser beams whose polarized directions cross almost perpendicularly.

4. A device according to claim 1, wherein said light source comprises a first light emission end for emitting said first laser beam; and a second light emission end for emitting said second laser beam, the first light emission end and the second light emission end being deviated with a predetermined distance.

5. A device according to claim 1, wherein a diffraction efficiency of said grating for said second laser beam has been preset such that the power of the diffracted light of said second laser beam is set to a power at which the information on said track is not erased during the reproduction of information.

6. A device according to claim 1, further comprising wave synthesizing means for synthesizing incoming light beams to emit the resultant light toward the information recording medium, wherein said light source is constructed by a separate structure comprising a first light source for emitting said first laser beam and a second light source for emitting said second laser beam, and said grating is position so as to diffract the second laser beam, and said wave synthesizing means synthesizes the first laser beam and the diffracted light beam of the second laser beam.

7. A device according to claim 6, wherein said first and second light sources emit said first and second laser beams to said wave synthesizing means along substantially the same optical axis.

8. A device according to claim 1, wherein said controller further performs a control to stop the emission of said second laser beam or to set the power of said second laser beam to a power at which the information recorded on said track is not erased during the recording of information.

9. A device according to claim 1, wherein said controller further performs a control to set the power of said second laser beam during the reproduction of information to a power at which the information recorded on said track is not erased.

10. An information recording/reproducing apparatus having the pickup device according to claim 1, wherein said apparatus further comprises a crosstalk cancelling circuit for detecting each of reflected light beams of the first and second laser beams when said first and second laser beams reflect off said track during the reproduction of information, and removing crosstalk components included in the reflected light beams of said first laser beam, based on each of the detected signals.

11. A pickup device for recording information on an information recording medium and/or reproducing information from the information recording medium, comprising:

a first optical path for a first laser beam irradiating the information recording medium during recording of information or during reproduction of information;

a second optical path for a second laser beam irradiating the information recording medium at tracks adjacent to a track which is irradiated by said first laser beam at least during the reproduction of information;

a controller for independently controlling powers of the first and second laser beams which irradiate the information recording medium such that the power of the second laser beam can be decreased during the recording of information; and a grating in the second optical path through which the second laser beam is transmitted and diffracted.

12. A pickup device of claim 11, wherein polarized states of the first and second laser beams are different from each other, and the grating is in the first optical path such that a predetermined linearly polarized component of an incoming beam is transmitted therethrough without being diffracted.

* * * * *